United States Patent
Michna et al.

(10) Patent No.: US 10,622,863 B2
(45) Date of Patent: Apr. 14, 2020

(54) DRIVE UNIT

(71) Applicant: Dr. Ing. h.c. F. Porsche Aktiengesellschaft, Stuttgart (DE)

(72) Inventors: Gregor Michna, Remseck (DE); Pascal Gassmann, Stuttgart (DE); Gerhard Groetzschel, Sternenfels (DE); Benjamin Eickmeyer, Kornwestheim (DE); Johannes Regner, Stuttgart (DE)

(73) Assignee: Dr. Ing. h.c.F. Porsche Aktiengesellschaft (DE)

( * ) Notice: Subject to any disclaimer, the term of this patent is extended or adjusted under 35 U.S.C. 154(b) by 0 days.

(21) Appl. No.: 15/825,351

(22) Filed: Nov. 29, 2017

(65) Prior Publication Data

US 2018/0159400 A1 Jun. 7, 2018

(30) Foreign Application Priority Data

Dec. 1, 2016 (DE) .......................... 10 2016 123 221

(51) Int. Cl.
*H02K 5/04* (2006.01)
*B60K 1/00* (2006.01)

(52) U.S. Cl.
CPC ................. *H02K 5/04* (2013.01); *B60K 1/00* (2013.01); *B60Y 2304/07* (2013.01); *B60Y 2304/072* (2013.01)

(58) Field of Classification Search
CPC ... H02K 5/04; H02K 5/06; H02K 5/08; B60K 1/00; B60Y 2304/07; B60Y 2304/072
USPC .......................................................... 310/89
See application file for complete search history.

(56) References Cited

U.S. PATENT DOCUMENTS

| | | | |
|---|---|---|---|
| 4,859,889 A * | 8/1989 | Andrews ................. | H02K 5/15 310/89 |
| 7,078,836 B2 | 7/2006 | Sakakibara | |
| 2005/0062349 A1 | 3/2005 | Sakakibara | |
| 2008/0020877 A1* | 1/2008 | Bogner ..................... | F16H 7/14 474/110 |
| 2009/0050459 A1* | 2/2009 | Ahn ....................... | H02K 5/148 200/400 |
| 2014/0252922 A1 | 9/2014 | Ritchey et al. | |

FOREIGN PATENT DOCUMENTS

| | | |
|---|---|---|
| CN | 204068540 | 12/2014 |
| CN | 105406638 | 3/2016 |
| DE | 8808854 U1 | 11/1989 |
| DE | 3823350 A1 | 1/1990 |
| DE | 10318430 A1 | 11/2004 |
| DE | 102004044148 A1 | 5/2005 |
| DE | 102004048284 A1 | 4/2006 |
| DE | 202014010659 U1 | 3/2016 |

OTHER PUBLICATIONS

German Search Report dated Oct. 10, 2017.
Chinese Examination Report dated May 31, 2019.

* cited by examiner

*Primary Examiner* — Terrance L Kenerly
(74) *Attorney, Agent, or Firm* — Gerald E. Hespos; Michael J. Porco; Matthew T. Hespos

(57) ABSTRACT

A drive unit (1) has a housing (2) and an output-side element (3). The housing (2) has at least two webs (8) that lie opposite one another and that project from the housing (2) in a manner so that the webs (8) are spaced apart from one another. The webs (8) are configured to fasten the housing (2) to a mounting unit (7).

11 Claims, 3 Drawing Sheets

DRIVE UNIT

CROSS REFERENCE TO RELATED APPLICATION

This application claims priority under 35 USC 119 to German Patent Appl. No. 10 2016 123 221.1 filed on Dec. 1, 2016, the entire disclosure of which is incorporated herein by reference.

BACKGROUND

1. Field of the Invention

The invention relates to a drive unit, in particular for a motor vehicle.

2. Description of the Related Art

Drive units usually are screwed to a holder to ensure a stable arrangement during torque transmission. A screwed connection of this type is complicated, however, and usually does not allow precision adaptation because the screwed connection bores previously are fixed on the drive unit and on the holder. Thus, a minor, tolerance-induced displacement relative to one another often is not possible.

It is therefore an object of the invention to provide a drive unit that can be fastened simply and quickly in a positionally stable and durable manner, while permtting tolerance-induced adaptations in the positioning of the drive unit. It is also an object of the invention to provide secure mounting of a drive unit on a mounting unit.

SUMMARY

One embodiment of the invention relates to a drive unit having a housing with an output-side element. At least two spaced apart webs project from from the housing to lie opposite one another. The webs enable the housing of the drive unit to be fastened to a mounting unit, while also permitting the position to be adapted at least slightly. The webs produce a sliding guide that allows simple positioning. The drive unit has an output-side element, such as an output shaft, that drives external elements or units.

In one embodiment, the two webs are arranged at an angle of more than 60° and less than 180° with respect to one another. This achieves a situation where satisfactory guidance can take place with simultaneous possible lateral pressing. An angle of the webs in the range of more than 60° and less than 180°, in particular more than 60° and less than 120°, particularly preferably more than 75° and less than 90°, achieves lateral pressing of the webs to bring about a favorable force in the vertical direction, for example onto the mounting unit so that secure fastening can be achieved.

At least one of the webs may be connected to the housing by transverse ribs that protrude from the respective web. The ribs stiffen the web or the webs so that a satisfactory transmission of force can take place on the web or on the webs.

The transverse ribs may be on both webs. The transverse ribs of each web may be oriented toward the other respective other web. As a result, the webs are arranged so that a satisfactory transmission of force with satisfactory stiffening of the webs can take place in the case of a lateral force on the webs toward the respective other web.

The transverse ribs may be arranged between the webs. Thus, satisfactory stiffening for promoting the transmission of force also is achieved.

The two webs may form dovetail-like projections of a dovetail guide. As a result, the drive unit can be pushed with its webs into the dovetail guide.

The housing may be configured so that the webs and/or the transverse ribs are configured integrally or unitarily with the housing, such as by way of a casting process or a machining production process.

The drive unit may be an electric motor. As a result, the electric motor can be positioned securely and can be fastened durably. The electric motor and/or the drive unit may be configured to be dismantled rapidly for replacement or repair.

The invention also relates to an arrangement of a drive unit with a mounting unit. The mounting unit may have a receptacle for receiving the webs of the drive unit. As a result, the drive unit can be connected simply to the mounting unit, by the webs of the drive unit being inserted or pushed into the receptacle of the mounting unit. The drive unit then can be fastened with its webs in the receptacle.

The mounting unit may have a clamp that can fasten the webs of the drive unit in the receptacle of the mounting unit. As a result, the drive unit can be clamped in the receptacle by means of the webs to connect the drive unit fixedly to the mounting unit.

Clamps may be provided for each of the webs and may be configured to clamp the respective web against an abutment. Thus, durable fastening is achieved.

In the following text, the invention will be described in detail using an exemplary embodiment with reference to the drawing.

DETAILED DESCRIPTION

Figure 1:
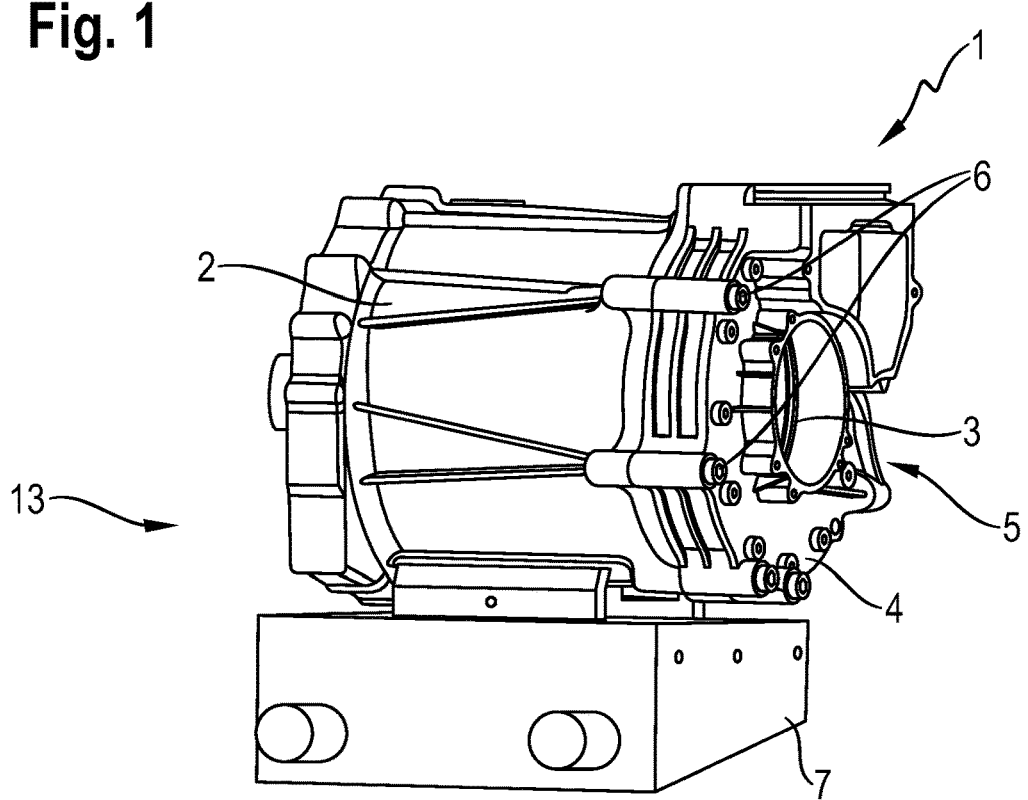
FIG. 1 is a perspective view of a drive unit having a mounting unit.
Figure 2:
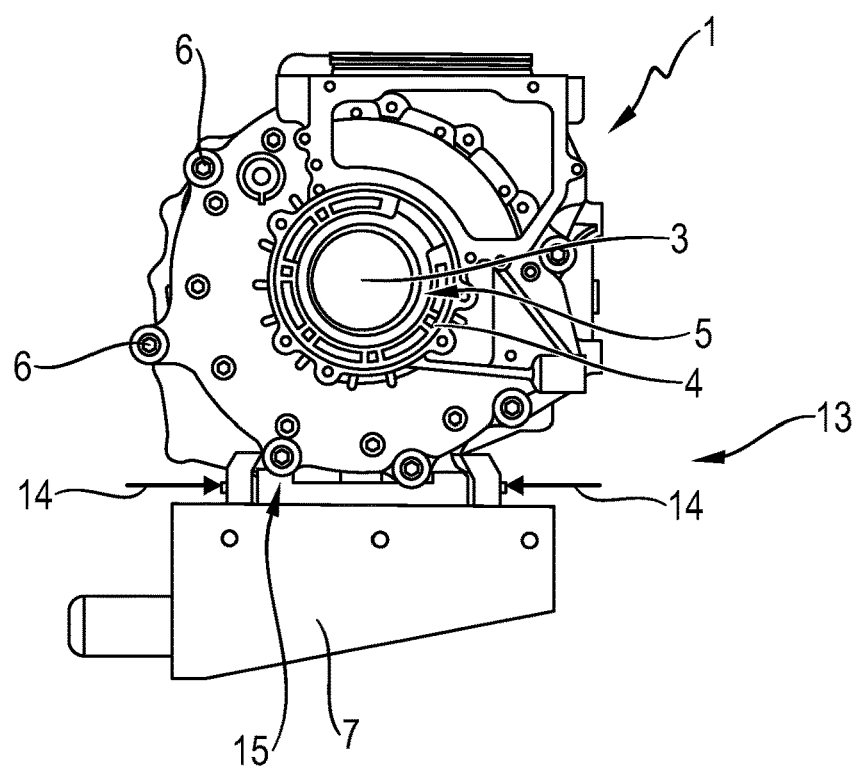
FIG. 2 is an end view of the drive unit having the mounting unit.

FIG. 1 shows a drive unit 1 having an approximately drum-like housing 2 and an output-side element 3. A cover 4 is placed on the housing 2. The cover 4 has an opening 5, and the output-side element 3 is arranged or protrudes through the opening 5 output-side element 3 protrudes. An outer periphery of the cover 4 is connected to the housing 2 by bolts 6. FIG. 2 is an end view of the same drive unit 1.

The drive unit 1 is connected to a mounting unit 7 so that the drive unit 1 is fastened durably by way of the mounting unit 7.

Figure 3:
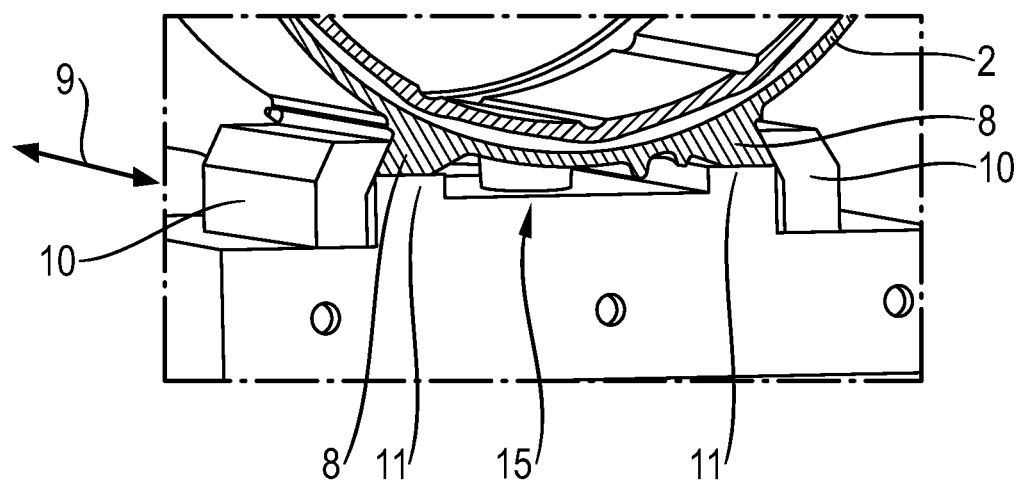
FIG. 3 is a perspective view partly in section and showing a detail of the drive unit having the mounting unit.
Figure 4:
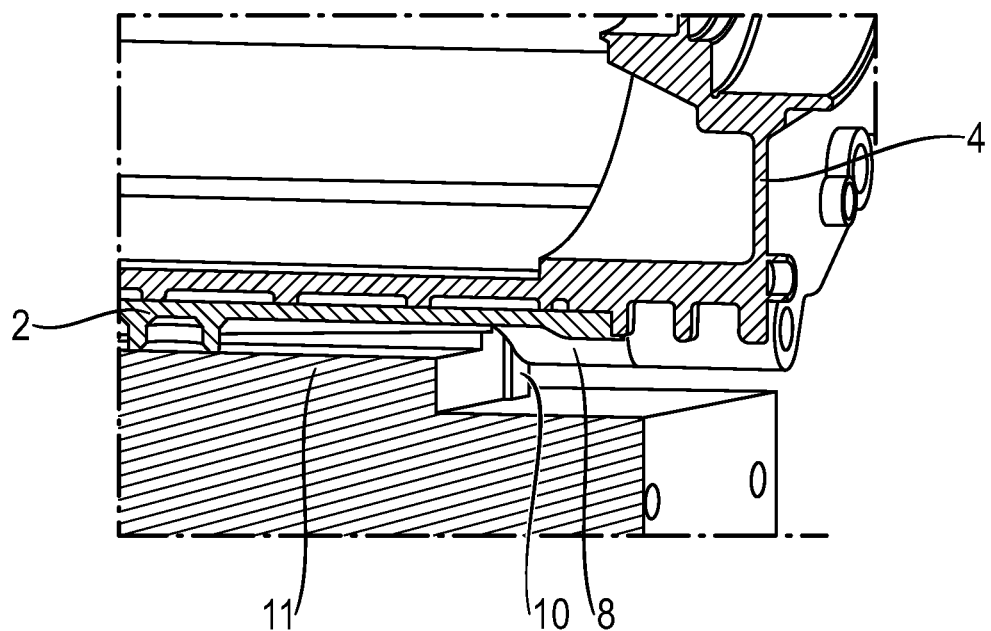
FIG. 4 is another perspective view partly in section and showing a detail of the drive unit having the mounting unit.

The housing 2 has spaced apart webs 8 that extend in a longitudinal direction 9, as shown in FIG. 3, and the mounting unit 7 has clamps 10 that clamp the webs 8 against an abutment 11 of the mounting unit 7, as shown in FIG. 4.

The housing 2 has at least two spaced apart webs 8 that lie opposite one another and project from the housing 2. The housing 2 can be fastened to a mounting unit 7 by the webs 8.

Figure 5:
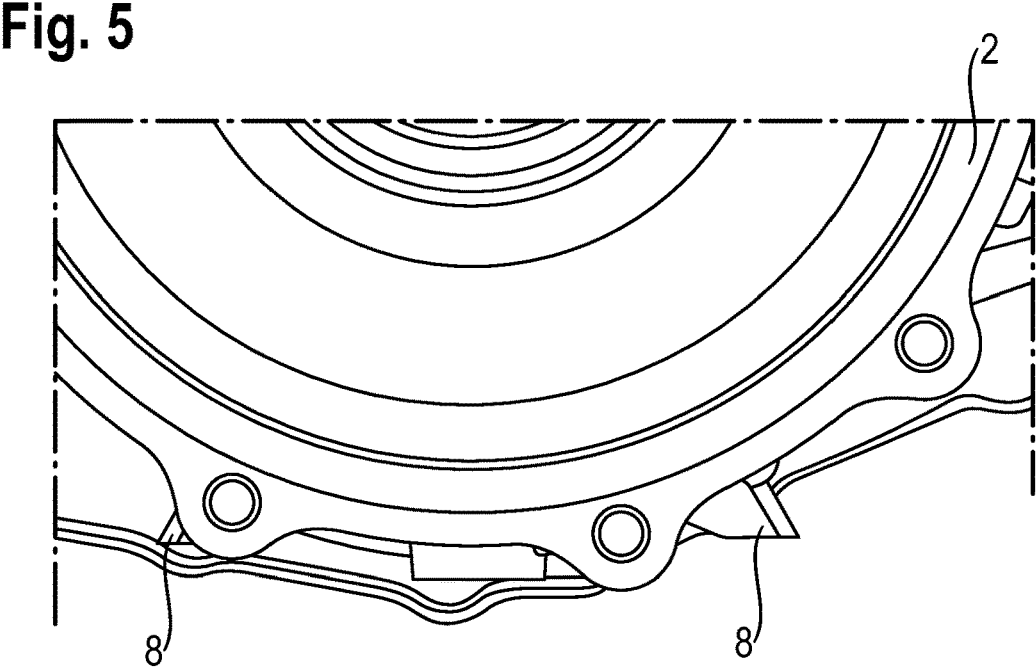
FIG. 5 is an end view of a detail of the housing of the drive unit.
Figure 6:
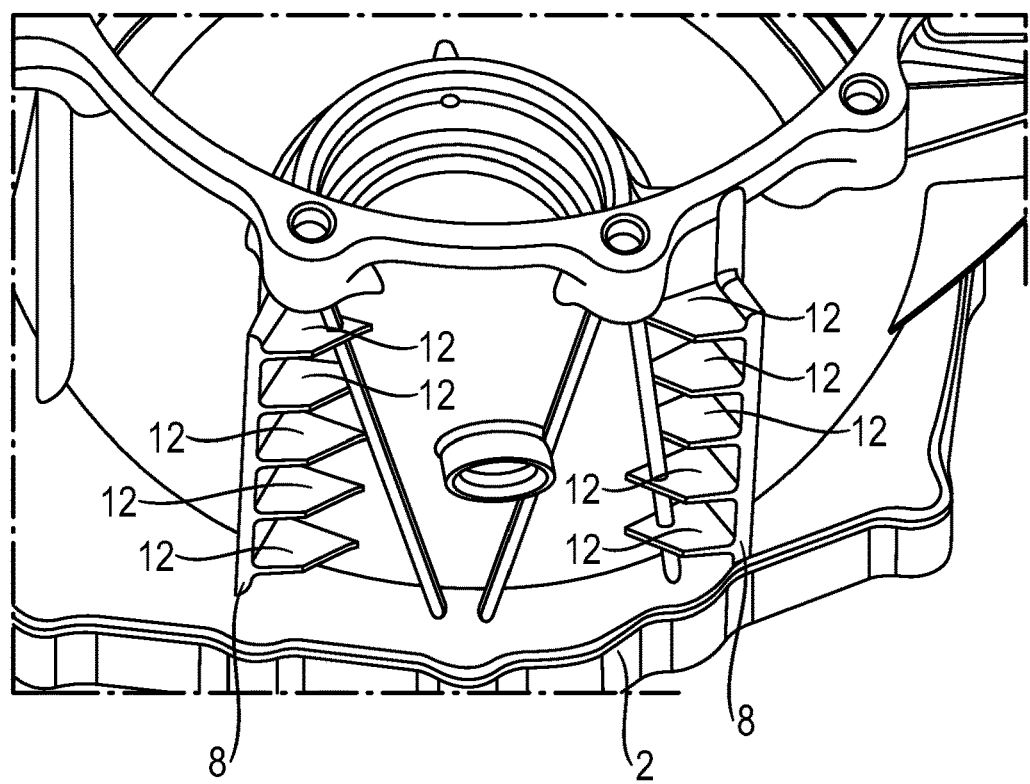
FIG. 6 is a perspective view of a detail of the housing of the drive unit.

The webs 8 of the housing 2 can be seen again more clearly in FIGS. 5 and 6. The webs 8 preferably are arranged at an angle of more than 60° and less than 180° with respect to one another, so that a sufficient force in the direction of the abutment 11 results during pressing of the webs by way of the clamps 10.

FIGS. 5 and 6 also show that at least one of the two webs 8 or else advantageously (as shown) both webs 8 are connected to the housing 2 by transverse ribs 12 that protrude from the respective web 8. The transverse ribs 12 and the webs 8 advantageously are configured in one piece with the housing 2. The housing 2 can consist of cast material, such as cast metal. For example, the housing can consist of aluminum, magnesium or an alloy thereof.

FIG. 6 shows an exemplary embodiment, in which transverse ribs 12 are formed on both webs 8, with the respective transverse ribs 12 on each web 8 being oriented toward the other web 8. Thus, the webs 8 with the respective transverse ribs 12 form a chamber-like structure. The transverse ribs 12 are spaced substantially equidistantly from one another. However, the transverse ribs 12 need not be equally spaced.

The illustrated embodiment shows that transverse ribs 12 are on both webs 8 and are between the webs 8. Thus, the transverse ribs 12 can absorb forces that act laterally from the outside on the two webs 8, as shown by the arrows 14 of FIG. 2.

Sides of the webs 8 that face away from the transverse ribs 12 are smooth and form a type of rail.

It can also be seen that the two webs 8 configure dovetail-like projections of a dovetail guide.

The drive unit 1 preferably is an electric motor. As an alternative, however, the drive unit 1 can be another power unit, for example an internal combustion engine or a hybrid engine with an electric motor and an internal combustion engine.

Overall, FIGS. 1 to 6 also show an exemplary embodiment of an arrangement 13 of a drive unit 1 with a mounting unit 7. The mounting unit 7 has a receptacle 15 for receiving the webs 8 of the drive unit 1. As a result, the clamps 10 push the webs 8 into the receptacle 15 and thereby fasten the housing 2 to the mounting unit 7.

The mounting unit 7 has the clamps 10 that act on the webs 8 of the drive unit 1 to fasten the webs 8 of the housing 2 in the receptacle 15 of the mounting unit 7. The clamps 10 can be clamping jaws that can be loaded, for example, by bolts so that the webs 8 can be clamped against the abutments 11. A clamp 10 thus preferably is provided for each of the webs 8 and clamps the respective web 8 against an abutment 11. As an alternative, only one of the webs can be loaded by a clamp 10, whereas the other web engages into a guide. Single-sided loading for clamping would be brought about as a result.

What is claimed is:

1. A drive unit configured for mounting on first and second abutment surfaces of a mounting unit, the drive unit comprising: a housing and an output-side element, the housing having first and second webs that lie opposite one another, the webs projecting from the housing and being spaced apart from one another, the first and second webs being formed respectively with first and second mounting surfaces disposed for mounting respectively on the first and second abutment surfaces of the mounting unit and first and second outer surfaces converging obliquely toward one another at farther distances from the mounting surfaces, and first and second clamps formed respectively with first and second clamping surfaces engaged respectively against the first and second outer surfaces of the respective webs, the clamps being loaded against the mounting unit and against the outer surfaces of the webs so that the clamps clamp the webs against the abutment surfaces of the mounting unit.

2. The drive unit of claim 1, wherein the outer surfaces of the webs are arranged at an angle of more than 60° and less than 180° with respect to one another.

3. The drive unit of claim 1, wherein at least one of the webs is connected to the housing by transverse ribs that protrude from the respective web.

4. The drive unit of claim 3, further comprising transverse ribs on each of the webs, the respective transverse ribs of each of the webs being oriented in a direction toward the respective other web.

5. The drive unit of claim 4, wherein the transverse ribs are arranged substantially between the webs.

6. The drive unit of claim 1, wherein the webs define dovetail-shaped projections of a dovetail guide.

7. The drive unit of claim 1, wherein the drive unit is an electric motor.

8. A drive arrangement, comprising:
a mounting unit comprising first and second abutments surfaces;
a drive unit having housing with first and second webs projecting from the housing and being spaced apart from one another, the first and second webs being formed respectively with first and second mounting surfaces disposed for mounting respectively on the first and second abutment surfaces of the mounting unit and first and second outer surfaces converging obliquely toward one another at farther distances from the mounting surfaces; and
first and second clamps formed respectively with first and second clamping surfaces engaged respectively against the first and second outer surfaces of the respective webs, the clamps being loaded against the mounting unit and against the outer surfaces of the webs so that the clamps clamp the webs against the abutment surfaces of the mounting unit.

9. The drive arrangement of claim 8, wherein the clamping surfaces converge obliquely toward one another at farther distances from the mounting unit.

10. The drive arrangement of claim 8, wherein the outer surfaces of the outer surfaces of the webs are arranged at an angle of more than 60° and less than 180° with respect to one another.

11. The drive arrangement of claim 8, wherein the drive unit is an electric motor.

* * * * *